United States Patent
Goslee

(10) Patent No.: US 6,793,360 B2
(45) Date of Patent: Sep. 21, 2004

(54) LIGHTED ARCHITECTURAL MESH

(75) Inventor: Daniel Lee Goslee, Seaford, DE (US)

(73) Assignee: Cambridge, Inc., Cambridge, MD (US)

( * ) Notice: Subject to any disclaimer, the term of this patent is extended or adjusted under 35 U.S.C. 154(b) by 39 days.

(21) Appl. No.: 10/237,030

(22) Filed: Sep. 9, 2002

(65) Prior Publication Data

US 2004/0047142 A1 Mar. 11, 2004

(51) Int. Cl.$^7$ .................. H05B 33/12; D03D 13/00
(52) U.S. Cl. ......................... 362/84; 362/556
(58) Field of Search ............... 362/84, 145, 551, 362/554, 556, 570, 576

(56) References Cited

U.S. PATENT DOCUMENTS

| | | | |
|---|---|---|---|
| 4,234,907 A | | 11/1980 | Daniel |
| 4,625,140 A | * | 11/1986 | Gagnon ...................... 313/25 |
| 4,752,114 A | | 6/1988 | French |
| 4,907,132 A | * | 3/1990 | Parker ....................... 362/556 |
| 4,912,889 A | | 4/1990 | Palumbo |
| 5,021,928 A | * | 6/1991 | Daniel ....................... 362/556 |
| 5,066,085 A | | 11/1991 | Gimbustas et al. |
| 5,183,323 A | | 2/1993 | Daniel |
| 5,256,468 A | * | 10/1993 | Wiener ...................... 428/193 |
| 5,485,355 A | * | 1/1996 | Voskoboinik et al. ......... 362/84 |
| 5,701,236 A | | 12/1997 | Viviano |
| 5,879,069 A | * | 3/1999 | Chien ........................ 362/103 |
| 5,887,856 A | | 3/1999 | Everly, II |
| 6,464,381 B2 | * | 10/2002 | Anderson et al. ........... 362/488 |
| 6,628,885 B1 | * | 9/2003 | Wilkie et al. ............... 385/147 |

* cited by examiner

Primary Examiner—Alan Cariaso
(74) Attorney, Agent, or Firm—Burns, Doane, Swecker & Mathis, LLP

(57) ABSTRACT

An architectural mesh including a plurality of wires, where the wires are woven to form a mesh, and at least one light element interwoven with the plurality of wires in the mesh. The at least one light element includes an electroluminescent wire, plastic optical fiber, or similar device.

20 Claims, 2 Drawing Sheets

LIGHTED ARCHITECTURAL MESH

BACKGROUND OF THE INVENTION

The present invention relates to an architectural metallic mesh, and more particularly, to an architectural metallic mesh having a light element therein, and a method of making the same.

Architectural metallic meshes are generally used in commercial and business environments to provide elegant wall panels, doors and other surfaces whenever an aesthetic appearance of polish and prestige are of primary importance. Architectural mesh is also an excellent choice for high contact areas, such as the interior walls of elevator cabs, escalator walls, and sales and reception areas, because it is generally scratch, dent and corrosion resistant. As such, architectural metallic mesh maintains a stunning appearance with minimal maintenance.

Woven into panels from brass, stainless steel, copper, and/or other desired metals or alloys, architectural mesh offers a richness of texture, pattern and color that cannot be duplicated by any other material. Architectural mesh can also be polished, finished and combined with different background colors to create a custom look and configuration.

Depending upon the chosen weave, the interstices or apertures between the weft or fill wires and the warp wires may allow light to pass through the architectural mesh. However, when used in a closed interior space, it may not be possible to utilize this feature to further enhance the appearance of the architectural mesh panel. Further, if the weave is particularly tight and the wires are directly adjacent to one another, the passage of light through the mesh will be prevented.

Accordingly, it would be desirable to provide an architectural mesh having a light or lighted element therein, so as to create a greater aesthetic appeal in tightly woven mesh and for use of the same in environments benefitted by the presence of accent lighting.

SUMMARY OF THE INVENTION

The present invention provides an architectural mesh comprising a plurality of wires, wherein the wires are woven to form a mesh, and at least one light element interwoven with the plurality of wires in the mesh. In a preferred embodiment, the light element may be an electroluminescent wire or a plastic optical fiber, either one of which can be provided with a preselected color to create the desired accent lighting in the architectural mesh.

BRIEF DESCRIPTION OF THE FIGURES

These, and other objects, features, and advantages of the present invention will become more readily apparent to those skilled in the art upon reading the following detailed description, in conjunction with the appended drawings in which.

DETAILED DESCRIPTION OF THE PREFERRED EMBODIMENTS OF THE INVENTION

Figure 1:
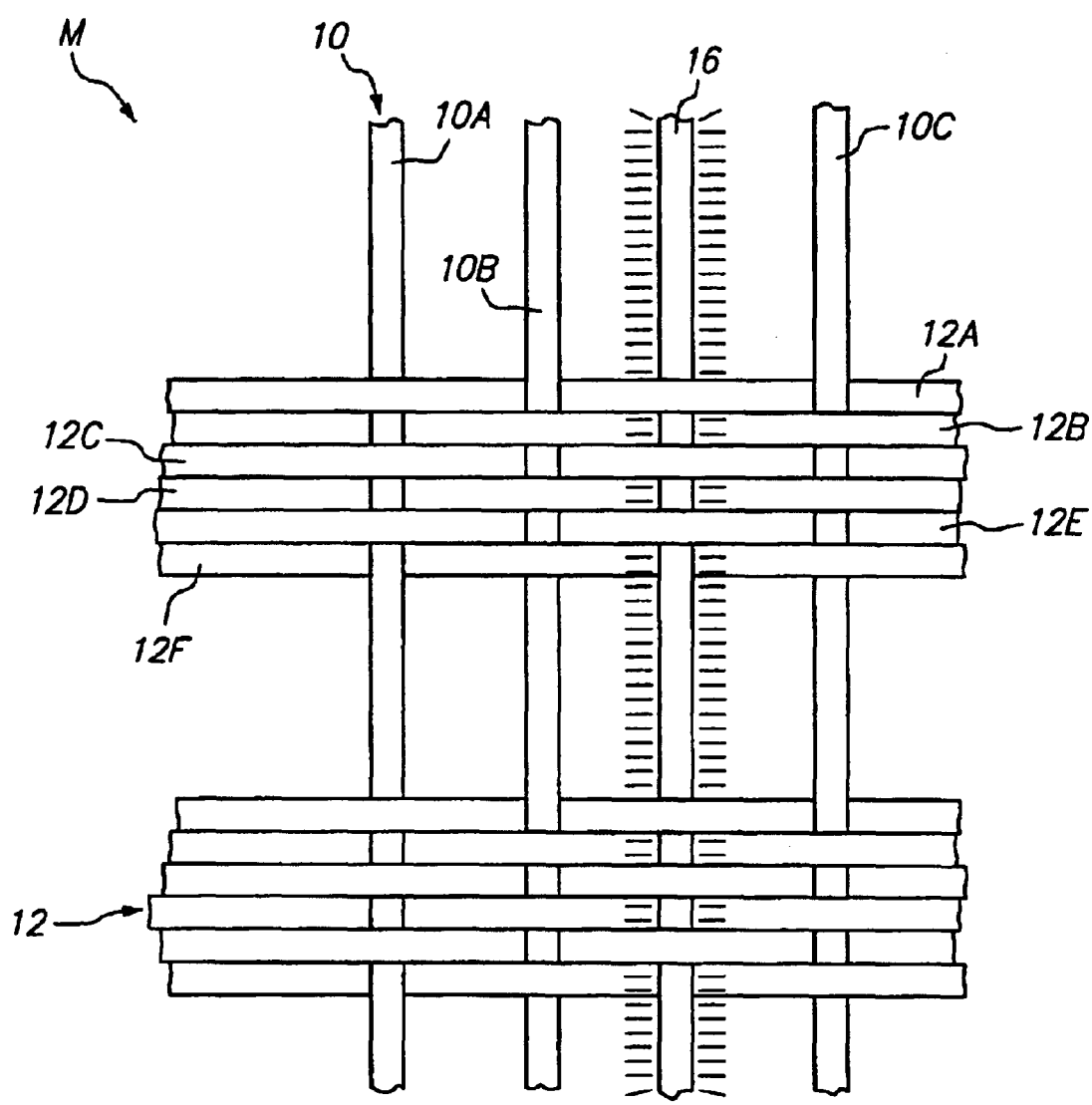
FIG. 1 is an exploded schematic view of a section of the architectural mesh in accordance with a first embodiment of the present invention.

Referring to FIG. 1, in the woven mesh M the members 10 are strands of wire in the fill or weft direction of weaving and the members 12 are strands of wire in the warp direction. Accordingly, the members 10 are designated in the drawings as wires 10a, 10b, and 10c, etc. in the weft direction and the members 12 are designated as wires 12a thru 12f in the warp direction. In the illustrated embodiment, the warp members 12 cross under and over the wires 10 in a plain weave. However, it should be apparent to one skilled in the art that other weaves, such as a twill weave or hollander (Dutch) weave, for example, could also be used. The wires 10 and 12 are illustrated in a spaced relation for ease of understanding, and although mesh M could be so manufactured, the wires would preferably be directly adjacent one another, or evenly spaced, in practice. Thus, the architectural mesh M is a typical example of a continuously woven metallic mesh having the wires 10a, etc. in the fill direction and the wires 12a, etc. in the warp direction The architectural mesh M further includes a light member 16 capable of providing an accent light effect to the metallic mesh. As illustrated in FIG. 1, the light member 16 is interwoven with the wires 10 and 12, and most preferably, is substituted for one or more of the wires 10 in the weft direction of weave. The light member may be formed from an electroluminescent wire, plastic optical fiber, or any similar device or mechanism known in the art to produce an illuminated glow.

The metallic mesh M is woven from a combination of wires of two or more different metals, for example, brass and stainless steel, or the mesh may be woven using wires 10 and 12 that are made from the same material. Similarly, all of the wires 10, 12 may be the same size or shape, or they may have different characteristics. The materials most commonly used in metallic mesh are stainless steel, aluminum, brass, bronze and copper. The combination of the different size wires and materials creates a unique texture appearance for architectural metallic mesh.

The light member 16 may preferably be an electroluminescent wire, also referred to as an electroluminescent cable, or electroluminescent rope. When the electroluminescent wire is powered or lit from one or more ends, the light member 16 will glow or sparkle to produce an aesthetically appealing addition to the architectural mesh. Electroluminescent wire generally comprises a core wire, such as a central copper wire, with a phosphorus coating and small transmitter or conductive wires wrapped therearound. The wire is then sealed by a waterproof PVC coating and finally a colored vinyl coat. Light is produced in the wire by supplying an alternating current to the conductive wires. Generally, a voltage source and driver may be used to power the wire. The driver takes the voltage from a DC power source and inverts it to 120 volts AC. When connected to a power source and driver, the charge creates a 360 degree "glow" on the electroluminescent wire, thereby closely resembling a neon light. The color which the electroluminescent wire produces is dependent upon the color selected for the colored vinyl coat. As incorporated into the architectural mesh of the present invention, blue, red, purple and white light are particularly appealing. It will be understood by one skilled in the art that any color could of course be selected. A suitable electroluminescent wire is available under the tradename Glowire from Glowire, LaOtto, Indianapolis.

The light member 16 may also preferably be a plastic optical fiber, generally comprising a transparent inner core and a thin exterior cladding. A light source, such as a light-emitting diode (LED) of any desired color, is applied to one or more ends of the plastic optical fiber so as to create the desired light effect. The LEDs may be powered by one or more batteries, and may be configured for either continuous power or flashing on and off for longer life. A suitable plastic optical fiber is available under the tradename SparkleGlo® from Poly-Optical Products, Inc., a Division of Lumitex, Inc., of Irvine, Calif.

Figure 2:
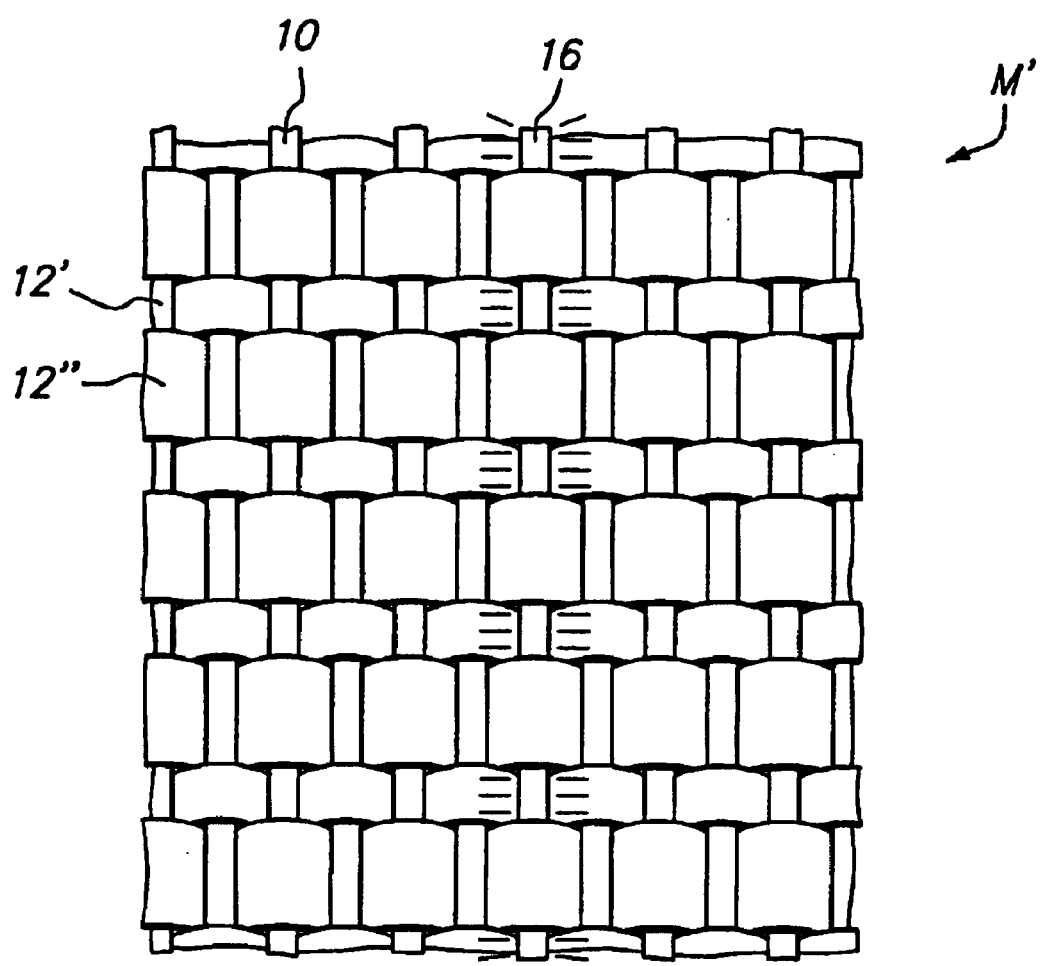
FIG. 2 is a top plan view of a section of the architectural mesh in accordance with a second embodiment of the present invention.

FIG. 2 illustrates a preferred embodiment of metallic mesh M' which is tightly woven by combining flat wire and round wire. The top surface of the mesh M' is not sanded or ground to produce a flat surface, but could be altered in this manner if desired. The mesh pattern is alternating with one narrow flat wire 12' under, one wide flat wire 12" over. In a preferred construction, narrow flat wire 12' is 0.044"×0.25", wide flat wire 12" is 0.44"×0.500", and the straight round wires or rods 10 have a diameter of 0.120". During the weaving process of mesh M', the light member 16 is inserted in place of one or more of the round rods 10.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the present invention as defined only by a proper interpretation of the appended claims.

What is claimed is:

1. An architectural mesh comprising:
   a plurality of wires, wherein said wires are woven to form a mesh; and
   at least one light element for producing a visible illumination throughout a length of said at least one light element, said at least one light element being interwoven with said plurality of wires in said mesh.

2. The architectural mesh of claim 1, wherein said plurality of wires include at least a plurality of first wires having a first diameter and a plurality of second wires having a second diameter.

3. The architectural mesh of claim 2, wherein said first and second wires are both formed from an identical material.

4. The architectural mesh of claim 3, wherein said material is selected from the group consisting of stainless steel, aluminum, brass, bronze and copper.

5. The architectural mesh of claim 2, wherein said first and second wires are formed from different materials.

6. The architectural mesh of claim 2, wherein said first and second diameters are substantially the same.

7. The architectural mesh of claim 2, wherein said first diameter is greater than said second diameter.

8. The architectural mesh of claim 1, wherein said light element includes an electroluminescent wire.

9. The architectural mesh of claim 8, wherein said electroluminescent wire produces a colored light emission.

10. The architectural mesh of claim 1, wherein said light element includes a plastic optical fiber.

11. The architectural mesh of claim 10, wherein said plastic optical fiber comprises a transparent inner core and an exterior cladding.

12. A light producing metallic mesh comprising:
    a plurality of warp wires;
    a plurality of weft wires; and
    at least one light element for providing an illuminated member having a visible illumination throughout its length;
    wherein said at least one light element is interwoven with said warp wires and said weft wires to form said light producing metallic mesh.

13. The metallic mesh of claim 12, wherein said plurality of warp and weft wires include at least a plurality of first wires having a first diameter and a plurality of second wires having a second diameter.

14. The metallic mesh of claim 13, wherein said first and second wires are both formed from an identical material.

15. The metallic mesh of claim 14, wherein said material is selected from the group consisting of stainless steel, aluminum, brass, bronze and copper.

16. The metallic mesh of claim 13, wherein said first and second wires are formed from different materials.

17. The metallic mesh of claim 13, wherein said first and second diameters are substantially the same.

18. The metallic mesh of claim 13, wherein said first diameter is greater than said second diameter.

19. The metallic mesh of claim 12, wherein said at least one light element includes an electroluminescent wire.

20. The metallic mesh of claim 12, wherein said at least one light element includes a plastic optical fiber.

* * * * *